(12) United States Patent
Gressel (10) Patent No.: US 7,444,893 B2
(45) Date of Patent: *Nov. 4, 2008

(54) BOOSTER ACTUATOR

(75) Inventor: James R. Gressel, Menominee, MI (US)

(73) Assignee: Ansul Incorporated, Marinette, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/977,981

(22) Filed: Oct. 29, 2004

(65) Prior Publication Data

US 2005/0199081 A1 Sep. 15, 2005
US 2007/0163369 A9 Jul. 19, 2007

Related U.S. Application Data

(60) Continuation of application No. 10/800,520, filed on Mar. 15, 2004, now Pat. No. 7,021,166, which is a division of application No. 09/907,195, filed on Jul. 17, 2001, now Pat. No. 6,722,216.

(51) Int. Cl.
*F16H 59/00* (2006.01)

(52) U.S. Cl. .................. 74/2; 74/3.52; 169/19; 292/15

(58) Field of Classification Search .......... 74/2, 74/3.52, 5, 6, 3.2; 169/21, 20, 19, 88; 292/15, 292/252

See application file for complete search history.

(56) References Cited

U.S. PATENT DOCUMENTS

| 3,610,050 A | 10/1971 | Pejcha |
| 3,638,501 A | 2/1972 | Prachar |
| 4,227,825 A | 10/1980 | Oesterle |
| 4,309,022 A | 1/1982 | Reinicke et al. |
| 4,549,719 A | 10/1985 | Baumann |
| 4,706,596 A | 11/1987 | Charvin et al. |
| 4,841,788 A * | 6/1989 | Thuries et al. ............ 74/2 |

(Continued)

FOREIGN PATENT DOCUMENTS

DE 44 31 624 C1 1/1996

(Continued)

OTHER PUBLICATIONS

Office Action dated Apr. 1, 2008 for Japanese Patent Application No. 2003-514123 (translation included).

*Primary Examiner*—Richard W L Ridley
*Assistant Examiner*—Matthew Johnson
(74) *Attorney, Agent, or Firm*—Brinks Hofer Gilson & Lione (57) ABSTRACT

A booster actuator 10 may be positioned between the solenoid 12 and a valve 14, and increases the energy output from the solenoid to activate the valve. The booster actuator 10 may include a force input member 28 and a force output member 30 each linearly movable with respect to a body 20 from an initial position to an activated position. A coil spring 46 biases the input member to the initial input position, while a plurality of disk springs 48 bias the output member 30 to the activated output position. A plurality of linking members 32 each pivotable with respect to the body normally retain the force output member in the initial position, but upon movement of the input member to the activated position release the force output member in response to the disk springs.

25 Claims, 6 Drawing Sheets

U.S. PATENT DOCUMENTS

| | | |
|---|---|---|
| 5,119,841 A | 6/1992 | McGill |
| 5,516,075 A | 5/1996 | Itoi et al. |
| 5,771,742 A | 6/1998 | Bokaie et al. |
| 6,101,888 A | 8/2000 | Yonezawa |
| 6,722,216 B2 | 4/2004 | Gressel |

FOREIGN PATENT DOCUMENTS

| | | |
|---|---|---|
| DE | 198 08 301 | 2/1998 |
| EP | 0 913 587 A2 | 6/1999 |

* cited by examiner

BOOSTER ACTUATOR

REFERENCE TO RELATED APPLICATIONS

This application is a continuation of U.S. application Ser. No. 10/800,520 filed on Mar. 15, 2004 (now U.S. Pat. No. 7,021,166), which is a divisional of U.S. application Ser. No. 09/907,195 filed on Jul. 17, 2001 (now U.S. Pat. No. 6,722,216).

FIELD OF THE INVENTION

The present invention relates to devices intended to be actuated by a low energy input, and which output a high energy to the device to be actuated. More particularly, the present invention relates to a booster actuator which uses mechanically stored energy to move an actuator shaft with a force and stroke sufficient to actuate various types of devices.

BACKGROUND OF THE INVENTION

Those involved in system designs have long required devices which provide a boost or energy level increase to actuate a device. Electric energy input to a solenoid is directly proportional to the output force, which practically limits the use of solenoids in conventional low power electrical systems. A relatively small and inexpensive electrical solenoid may send a signal which will stroke a solenoid plunger, although the force and/or the stroke of the plunger in many cases is insufficient to activate the device intended. Accordingly, boosters have been between such low energy products, such as solenoids, and a device to be activated to provide the desired energy level to actuate the intended device.

In the fire safety industry, various systems have been devised so that pressurized gas may be released when a device is manually or automatically actuated. In some applications, a booster or booster actuator may be positioned between a solenoid and a valve, with that valve in turn being actuated to release agents, such as $CO_2$ or a mixture of nitrogen, argon, and carbon dioxide, into the hazard area.

Prior art booster actuators have used magnetized components to hold the actuator in the set or armed position. Many of these actuators require an input force proportional to the desired output force, or require additional electrical circuitry to return the actuator to the set position.

Prior art actuators also include pressurized gas cartridges which are punctured, so that the release of the pressurized gas in response to the puncture may be used to activate a pneumatic device which releases the agent gas to the hazard area. Other types of actuators utilize explosive components to generate the increased energy to activate a valve or otherwise release the agent gas to the hazard area.

Many prior art boost devices have significant disadvantages which have limited their use. Prior art boost devices are relatively complex and/or are not highly reliable, and other devices cannot be easily reset. In still other booster devices, it is difficult to vary the force which activates the boost device and/or to vary the output force from the boost device. The disadvantages of the prior art are overcome by the present invention, and an improved booster actuator is hereinafter disclosed.

SUMMARY OF THE INVENTION

In a typical application, the booster actuator of the present invention may be located between a solenoid and a valve. The actuator body houses a cam shaft or force input member which is biased by a coil spring to the initial input position. The body also houses an actuator shaft or force output member which is biased to the activated output position by a plurality of disk springs. A plurality of circumferentially spaced links engage the force input member at one end and the force output member at the other end, and control of the release of the force from the disk springs to the output member in response to movement of the cam shaft. In another embodiment, an electrical coil is provided about the cam shaft, so that a combination solenoid and booster is provided.

It is an object of the present invention to provide a booster apparatus with a force input member and a force output member each movable relative to the actuator body, a biasing member for biasing the force output member to the activated output position and at least one linking member between the force input member and the force output member and pivotably movable with respect to the body from the engaged position to a disengaged position for releasing the force output member to the activated output position in response to the biasing member. The linking member engages both the force input member and force output member, and may cooperate with recesses in the input member and output member for achieving the desired function.

It is another feature of the invention to provide a booster actuator with a force input member, a low force biasing member for exerting a biasing force on the input member, a force output member, another biasing member for exerting a high biasing force on the force output member, and a linking member between the force input member and force output member. Control of the actuator may be reliably obtained by providing two biasing members each of which exert a force independent of the other biasing member on the input member or output member.

It is a feature of the present invention to provide a booster actuator wherein the output force from the actuator may be easily revised without redesigning the remainder of the actuator. Moreover, the change in the output force is independent of the energy required to trigger activation of the booster, and the input energy required to trigger the actuator may be separately selected without regard to the output requirements from the actuator.

It is another feature of the invention that the booster actuator is highly reliable, and may be mechanically reset without the use of electrical devices. The reset may be accomplished quickly and easily, and no replacement of parts is necessary.

It is a further feature of the invention to provide a booster actuator wherein a solenoid coil is provided to control movement of the force input member relative to the actuator body.

It is an advantage of the present invention that the booster apparatus is highly reliable and may be economically manufactured. The booster body preferably seals the internal components from the environment.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
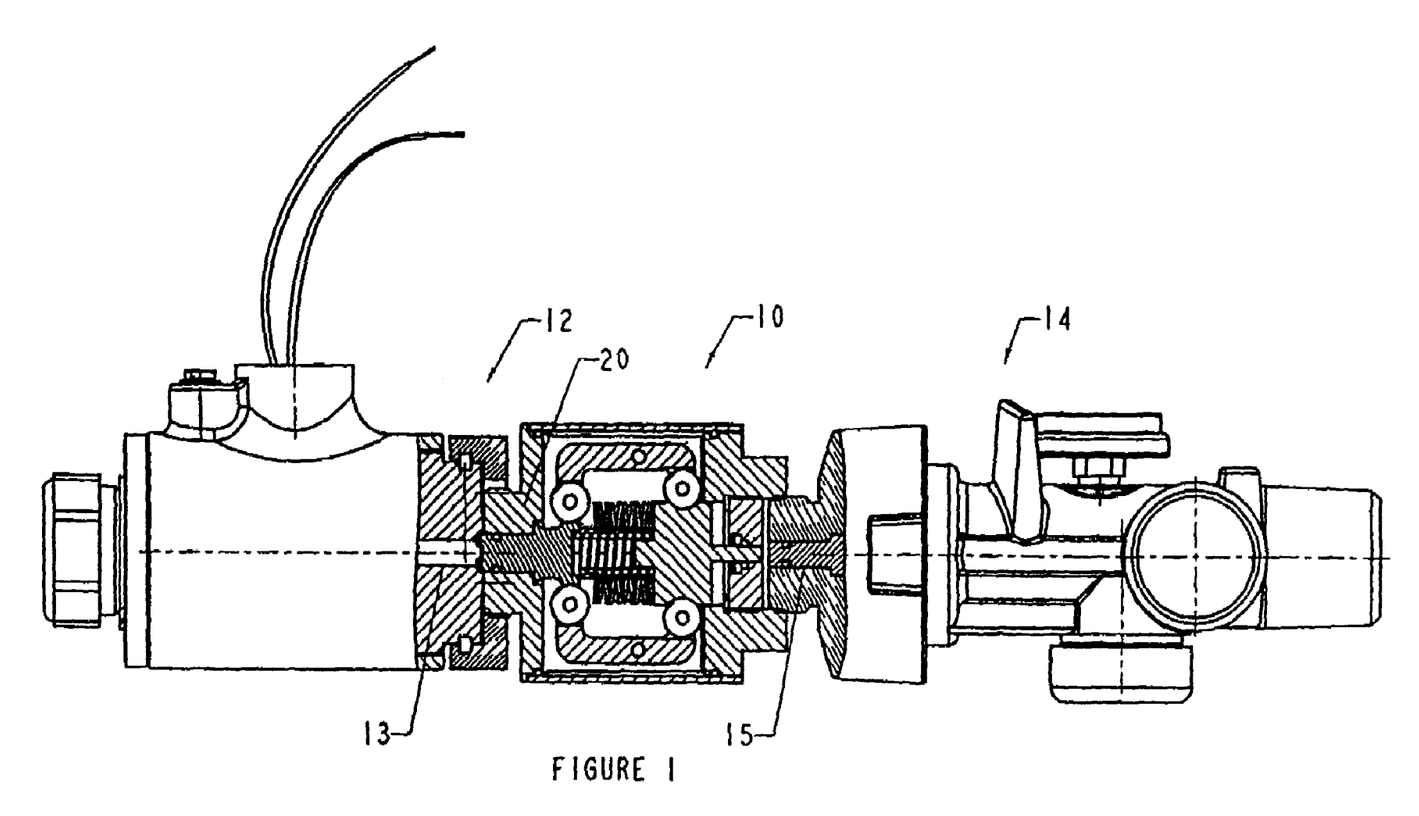
FIG. 1 is a simplified cross-sectional view of a booster actuator according to the present invention positioned between an electrically activated solenoid and a valve which is connected to a pressurized gas system.

Referring to FIG. 1, the booster actuator 10 may be threadedly secured at one end to the body of a solenoid 12 or another electrically actuated device, and may be similarly connected at its opposed end to a valve 14, with the valve 14 intended to release gas to an area in response to a sensed hazardous condition. The booster apparatus thus may be used in conjunction with a relatively low energy electrical system which monitors the surrounding environment, and outputs an electrical signal to actuate the solenoid 12 in response to the sensed condition to release a selected gas, e.g., for extinguishing a fire. As shown in FIG. 1, the solenoid 12 includes a plunger 13 which is movable relative to the body 20 of the booster actuator 10. The actuator 10 receives this low energy input and outputs a high energy to control plunger 15 of the valve 14, thereby activating the valve 14 to release the compressed gas to the environment.

Figure 2:
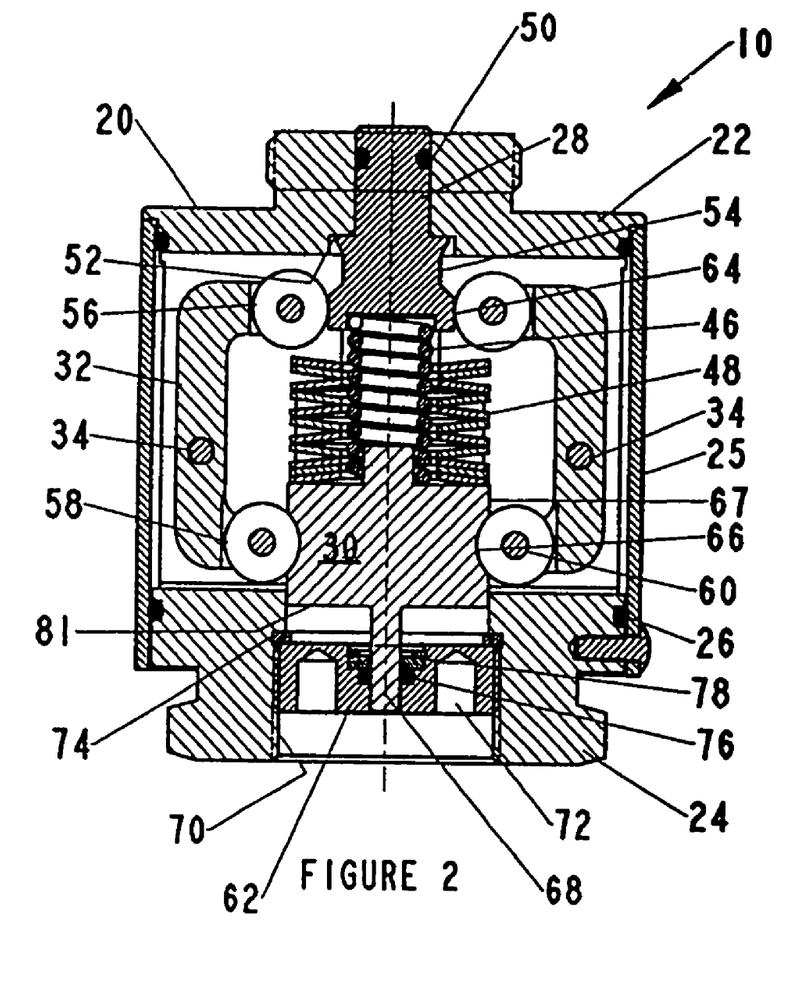
FIG. 2 is a cross-sectional view of a booster actuator generally shown in FIG. 1. An internal portion of the body has been removed for clarity of the illustrated components.

The actuator 10 as shown in FIG. 2 includes a body 20 having a force receiving input end 22 and a force delivery output end 24. Outer sleeve 25 may be provided for engagement with conventional seals 26 to seal the interior of the body. The cam shaft or force input member 28 is movable relative to the body from an initial input position as shown in FIG. 2 to an activated output position in response to movement of the solenoid plunger. The force output member 30 is similarly movable relative to the body from the initial output position as shown in FIG. 2 to an activated output position. Four links 32 are equally spaced at 90° intervals about both the force input member and the force output member, and are each pivotable about the pin 34 which is supported on the body 20. The coil spring 46 biases the force input member to the initial input position, and a plurality of disk springs, such as disk springs 48, bias the output member 30 to the activated output position.

The force input member 28 is sealed with the body by a conventional O-ring 50, and in the initial input position is biased by the coil spring 46 to engage shoulder 52 on the body. Input member 28 includes an annular recess 54 for receiving the upper end of each of the linking members 32 when in the disengaged position, thereby allowing release of the force output member 30 normally held in the initial position by the lower end of each linking member. As indicated in FIG. 2, an upper roller 56 may be provided at the upper end of each link 32, and a similar roller 58 may be provided at the lower end of each link. When the actuator is in the initial position, each of the upper rollers thus engages the cylindrical exterior surface 64 of the input member 28, while each lower roller 58 fits at least partially within annular recess 66 in the force output member 30. Each roller is rotatably mounted on a link with a respective pin 60 which is fixed to the link, and each link itself is pivotable about pin 34 which is supported on the actuator body 20. The position of the input member 28 thus retains each of the four links in the position as shown in FIG. 2, which in turn prevents downward movement of the force output member 30 in response to the disk springs 48.

A stop plate 62 has a central aperture therein sized to receive plunger 68 of the force output device 30, with the stop plate being interconnected with the body by threads 70. Conventional ports 72 may be provided in the stop plate for receiving a suitable tool to thread the stop plate in place, with the final position of the stop plate resting against snap ring 74. An O-ring 76 is held in position within the stop plate by a combination back-up ring and retaining ring 78, and provides sealing engagement between the plunger 68 and the stop plate 62.

It is a particular feature of the invention that the force required to move the input member 28 may be easily adjusted by varying the selection of the coil spring 46. The coil spring is sized so that the booster actuator will not inadvertently activate in response to vibration, jarring, and other forces commonly transmitted to a system. The selection of the number of coils and the material for the coils for the spring 46 are independent, however, of the selection of the biasing member 48, which preferably is a plurality of disk springs. The number of disk springs and the orientation of these springs with respect to each other affect the force and the stroke which will move the force output member to the activated position, thereby extending the plunger from the stop plate and, in an exemplary application, actuating the valve as shown in FIG. 1. For this exemplary embodiment, it should be understood that the force output member may move from the initial position as shown in FIG. 2 to a position wherein the surface 81 engages the snap ring 74. This movement of the force output member 30 to the activated output position thus results when each of the rollers 58 moves out of engagement with the recess 66, so that each of the rollers 58 rolls out of the recess and into engagement with the cylindrical surface 67 on force output member 30. At the same time, upper rollers 56 roll out of engagement with the cylindrical surface 64 in the force input member and roll partially at least within the annular recess 54 sized to receive these rollers. This action thus causes pivoting of the links 32 to release the force output member to the activated position.

Figure 3:
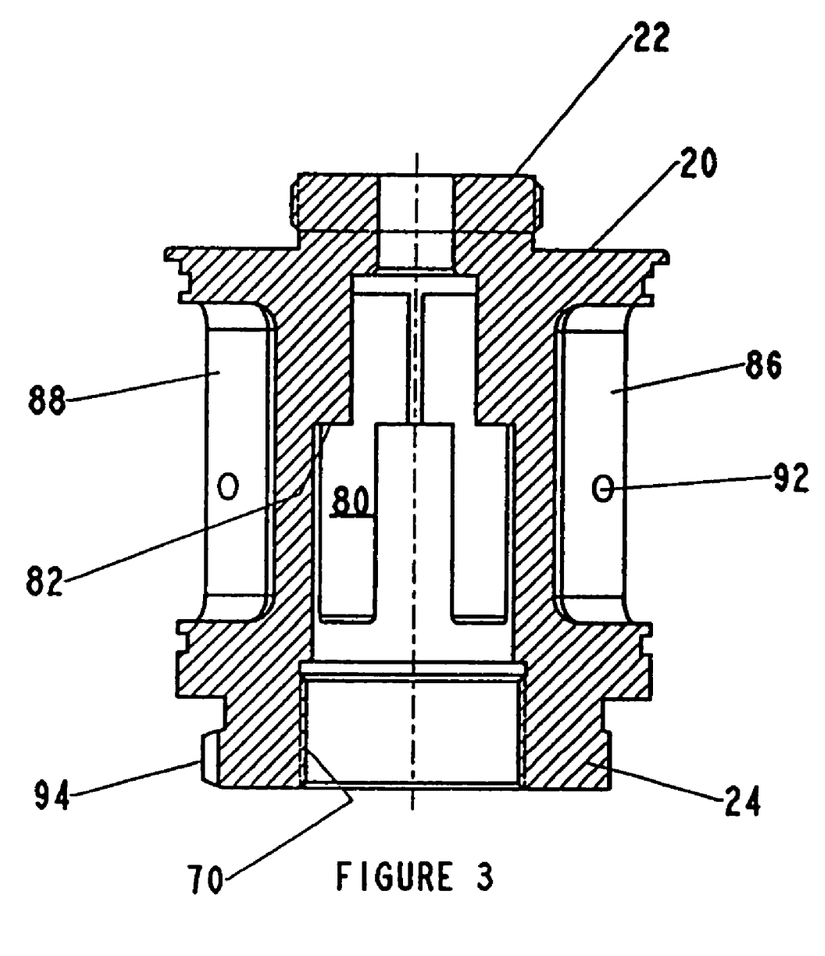
FIG. 3 is a cross-sectional view of the body generally shown in FIG. 2.
Figure 4:
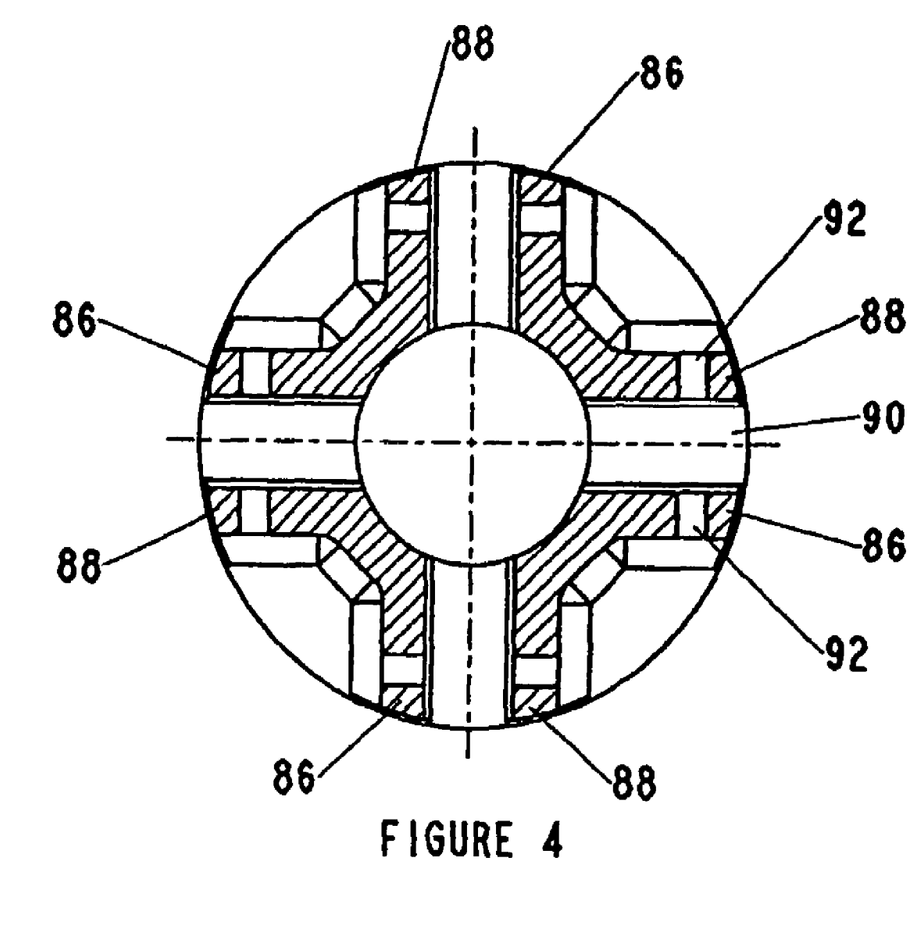
FIG. 4 is another cross-sectional view of the body, illustrating the spaced apart guides for receiving each of the four linking members.

FIG. 3 shows in greater detail the construction of a suitable actuator body 20, and particularly the cavity 80 for receiving the disk springs 48. The uppermost disk spring as shown in FIG. 2 thus rests against the surface 82 as shown in FIG. 3. FIGS. 3 and 4 also depict four pairs of circumferentially spaced guide plates 86 and 88, thereby providing a slot 90 therebetween for receiving a suitable link 32. FIG. 4 also depicts the aligned throughports 92 in each pair of guide plates for receiving a suitable link pin 34. The lower flange 94 of the body 20 may have a suitable exterior configuration, such as a hex configuration, for engagement with a conventional tool to facilitate threadably connecting the body 20 to a solenoid.

It is a feature of the invention that the interior of the body 20 and thus each of the movable components within the body is sealed from the surrounding environment, with this objective being accomplished by the conventional seals 26 which seal between sleeve 25 and the body, and by the seals 50 and 76 which seal with the force input member and the force output member, respectively. A sufficient seal may be created between the body 20 and the stop plate 62 due to interference of the threads although, if desired, another O-ring seal could be provided for sealing between the stop plate and the body.

In preferred embodiments, at least three linking members are circumferentially arranged about the force input member and the force output member. Three linking members at 120° interval spacing provide high reliability by distributing the applied forces equally about the input member and the output member. A preferred embodiment as shown in the figures utilizes four linking members spaced at 90° intervals. The rollers 56 and 58 provided at the end of the linking members reduce frictional forces when the linking members are moved from an engaged position as shown in FIG. 2 for retaining the force output member 30 in the initial output position to a disengaged position which releases the force output member to the activated output position. In alternate embodiments, the rollers may be eliminated, or may be replaced with other conventional members intended to reduce friction with the force input and force output members.

Coil spring 46 acts between the force output member 30 and the force input member 28. The force of this spring may be easily altered without modifying other components of the booster actuator in order to change the force required to activate the booster 10. Similarly, the size, orientation, and number of disk springs 48 may be altered to effect the stroke length and/or the force which will be output by the plunger 68 when moved to the activated output position. Alternative types of springs or other biasing members may be utilized.

The booster actuator of the present invention provides a mechanical separation of the input member and the output member. The coil spring 46 biases the input member to the initial position, but this exerts a small force on the output member compared to the bias of the springs 48. By providing no direct mechanical connection between the input member and the output member, the reactive forces on the valve which are transmitted back to the force output member during actuation of the booster are prevented from being transmitted to the force input member and then to the solenoid. The coil spring thus isolates the reactive force on the output member from the forces applied to the input member, and a latching solenoid mechanism may thus be used to activate the booster without fear of damage from these reactive forces.

Figure 5:
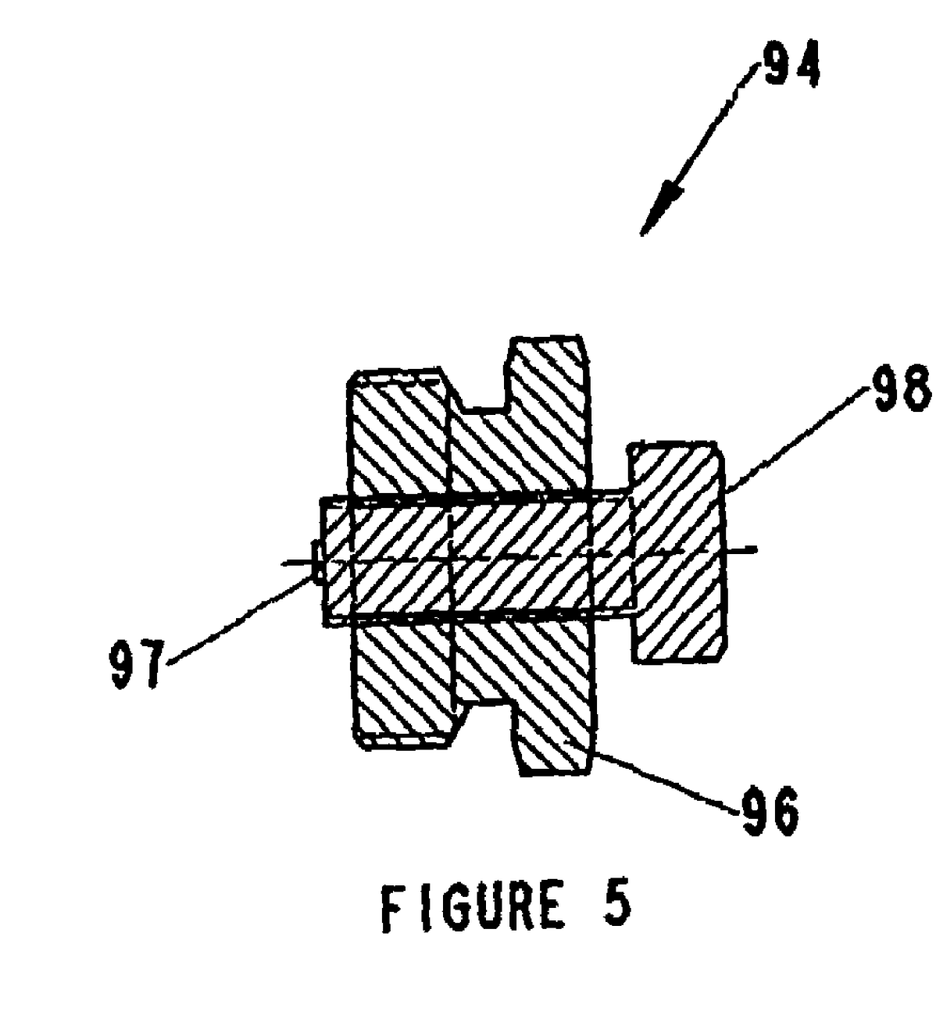
FIG. 5 is a side view of a suitable booster reset device.

Once the booster is activated, the booster may be easily reset without use of electrical devices, and without replacement of parts. After the valve 14 has been removed from the booster body, reset device 94 as shown in FIG. 5 may be connected to the threads 70 on the body. After the reset outer body 96 bottoms out against the stop plate 62, the bolt 98 may be rotated relative to outer body 96 to project the tip 97 toward the stop plate 62. The tip 97 is thereby forced into engagement with the end of the plunger 68, thereby forcing the force output member 30 back to the initial position as shown in FIG. 2. The return of the force output member to the initial position also increases the force on the coil spring to return the force input member to the initial position.

Figure 6:
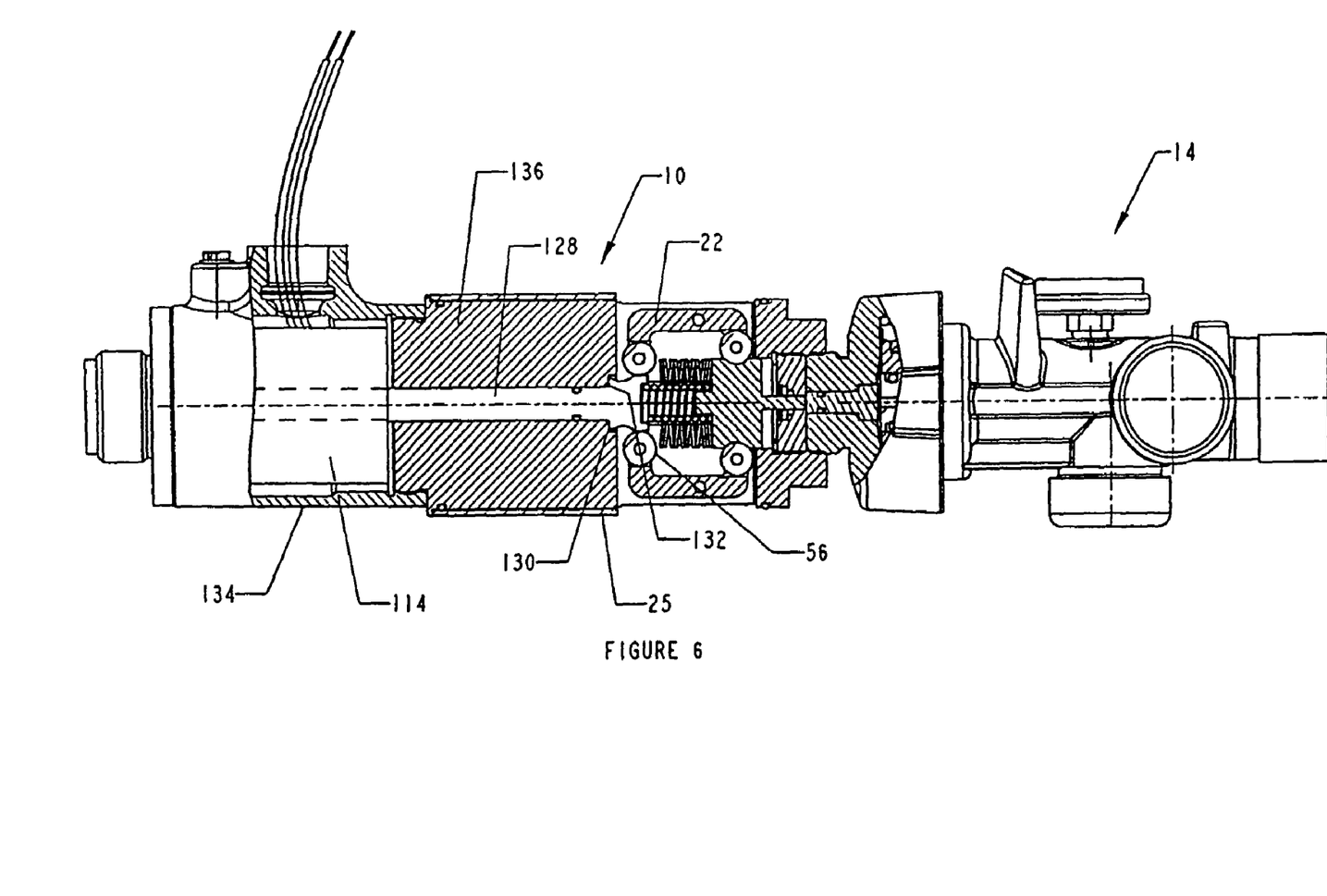
FIG. 6 is a side view of a portion of an alternate embodiment, with an electrical coil surrounding the cam shaft.

FIG. 6 depicts another embodiment of the invention, wherein a combination solenoid and booster actuator is provided. That portion of the booster 10 to the right of the force input member 128 may be as described above. In this embodiment, however, an extension of the force input member is provided so that the extended length force input member 128 is positioned within a solenoid coil 114. The solenoid coil may also be referred to as a magnetic latch subassembly, which receives electrical power to selectively move the input member 128. Those skilled in the art will appreciate that an extended length force input member may be used, as shown, or a two-piece or multi-piece mechanical interconnection made between the solenoid plunger and the force input member. Activation of the coil 114 thus initiates movement of the solenoid plunger, which in this case is the force input member 128. Force input member 128 includes a stop 130 for engagement with the surface 132 to limit the travel of the force input member. FIG. 6 depicts sleeve 134 enclosing the solenoid 114, and body 136 which connects sleeve 134 with sleeve 25.

While a preferred embodiment of the present invention has been illustrated in detail, it is apparent that modifications and adaptations of the proposed embodiment will occur to those skilled in the art. However, it is to be expressly understood that such modifications and adaptations are within the spirit and scope of the present invention as set forth in the following claims.

What is claimed is:

1. An actuator for receiving an energy input and outputting an energy output, the actuator comprising:
    a body having a force receiving input end and force delivery output end;
    a force input member movable relative to the body in direct response to the energy input from an initial input position to an activated input position;
    a force output member movable relative to the body in response to movement of the force input member from an initial output position to an activated output position, the energy output being independent with respect to the energy input;
    a first biasing member means for biasing the force input member to the initial input position, wherein the energy input overcomes the first biasing member means to move the force input member from the initial input position to the activated input position;
    a second biasing member for biasing the force output member; and
    a linking member between the force input member and the force output member and pivotally movable with respect to the body from an engaged position for retaining the force output member in the initial output position to a disengaged position for releasing the force output member to the activated output position, the linking member having an input end engaging the force input member and an output end engaging the force output member.

2. The actuator as defined in claim 1, wherein the force input member moves linearly within the body in direct response to the energy input from an initial input position to an activated input position; and
    wherein the force output member moves linearly within the body in response to movement of the force input member from an initial output position to an activated output position.

3. The actuator as defined in claim 1, wherein the second biasing member biases the force output member to the activated output position.

4. The actuator as defined in claim 1, wherein the linking member comprises a plurality of linking members, each extending between and circumferentially arranged about the force input member and the force output member.

5. The actuator as defined in claim 4, wherein each linking member is rotatably connected to the body at a pivot location on the linking member between the input end and the output end.

6. The actuator as defined in claim 5, wherein each linking member is movable with respect to the body from the engaged position for retaining the force output member in the initial output position to the disengaged position for releasing the force output member to the activated output position.

7. The actuator as defined in claim 1, wherein the force output member includes an output member recess for receiving an output end of the linking member when in the engaged position.

8. The actuator as defined in claim 7, wherein the force input member includes an input member recess for receiving an input end of the linking member when in the disengaged position, thereby allowing disengagement of the lower end of the linking member from the output member recess.

9. The actuator as defined in claim 1, wherein the force input member and the force output member are non-rigidly connected to one another.

10. The actuator as defined in claim 1, wherein the force input member is configured to be reset from the activated input position to the initial input position by resetting the force output member from the activated output position to the initial output position.

11. The actuator as defined in claim 10, wherein the force input member is configured to be reset from the activated input position to the initial input position solely by resetting the force output member from the activated output position to the initial output position.

12. The actuator as defined in claim 11, further comprising a stop plate interconnected with the body using threads, and
wherein a reset device connects with the threads on the body and engages with the stop plate to reset the force output member from the activated output position to the initial output position.

13. The actuator as defined in claim 12, wherein the reset device is rotated to project a tip on the reset device toward the stop plate in order to force the force output member from the activated output position to the initial output position.

14. The actuator as defined in claim 11,
wherein resetting the force output member from the activated output position to the initial output position moves the linking member to the engaged position and increases force on the first biasing member means to return the force input member to the initial input position.

15. The actuator as defined in claim 1, wherein the energy input comprises a low energy input and the energy output comprises a high energy output.

16. An actuator for receiving an energy input and outputting an energy output, the actuator comprising:
a body having a force receiving input end and force delivery output end;
a force input member linearly movable relative to the body in direct response to the energy input from an initial input position to an activated input position;
a first biasing member means for biasing the force input member, wherein the energy input overcomes the first biasing member means to move the force input member to the activated input position;
a force output member linearly movable relative to the body in response to movement of the force input member from an initial output position to an activated output position, the energy output being independent with respect to the energy input;
a second biasing member for biasing the force output member; and
a linking member between the force input member and the force output member and movable from an engaged position for retaining the force output member in the initial output position to a disengaged position for releasing the force output member to the activated output position.

17. The actuator as defined in claim 16, wherein the first biasing member means is biased to the initial input position; and
wherein the second biasing member is biased to the activated output position.

18. The actuator as defined in claim 16, wherein the force output member includes an output member recess for receiving an output end of the linking member when in the engaged position; and
wherein the force input member includes an input member recess for receiving an input end of the linking member when in the disengaged position, thereby allowing disengagement of the lower end of the linking member from the output member recess.

19. The actuator as defined in claim 16, wherein the force input member and the force output member are non-rigidly connected to one another.

20. The actuator as defined in claim 16, wherein the force input member is configured to be reset from the activated input position to the initial input position by resetting the force output member from the activated output position to the initial output position.

21. The actuator as defined in claim 20, wherein resetting the force output member from the activated output position to the initial output position moves the linking member to the engaged position and increases force on the first biasing member means to return the force input member to the initial input position.

22. The actuator as defined in claim 16, wherein the energy input comprises a low energy input and the energy output comprises a high energy output.

23. A booster actuator for receiving a low energy input and outputting a high energy output, the booster actuator comprising:
a body having a force receiving input end and force delivery output end;
a force input member movable relative to the body in direct response to the energy input from an initial input position to an activated input position;
a first biasing member means for biasing the force input member, wherein the energy input overcomes the first biasing member means to move the force input member to the activated input position;
a force output member movable relative to the body in response to movement of the force input member from an initial output position to an activated output position, the energy output being independent with respect to the energy input, resetting the force input member being dependent on resetting the force output member;
a second biasing member for biasing the force output member; and
a linking member between the force input member and the force output member; and pivotally movable with respect to the body from an engaged position for retaining the force output member in the initial output position to a disengaged position for releasing the force output member to the activated output position, the linking member having an input end engaging the force input member and an output end engaging the force output member.

24. The booster actuator as defined in claim 23, wherein the force input member is configured to be reset from the activated input position to the initial input position in response to resetting the force output member from the activated output position to the initial output position.

25. An actuator for receiving an energy input and outputting an energy output, the actuator comprising:
a body having a force receiving input end and force delivery output end;
a force input member movable relative to the body in response to the energy input from an initial input position to an activated input position;
a first biasing member for biasing the force input member;
a force output member movable relative to the body in response to movement of the force input member from an initial output position to an activated output position;

a second biasing member for biasing the force output member; and a linking member between the force input member and the force output member and movable from an engaged position for retaining the force output member in the initial output position to a disengaged position for releasing the force output member to the activated output position, wherein resetting the force output member from the activated output position to the initial output position moves the linking member to the engaged position and increases force on the first biasing member to return the force input member to the initial input position.

* * * * *

UNITED STATES PATENT AND TRADEMARK OFFICE
CERTIFICATE OF CORRECTION

PATENT NO.          : 7,444,893 B2                                        Page 1 of 1
APPLICATION NO.  : 10/977981
DATED                  : November 4, 2008
INVENTOR(S)        : James R. Gressel It is certified that error appears in the above-identified patent and that said Letters Patent is hereby corrected as shown below:

In column 8, claim 23, line 44, immediately after "force output member" delete ";".

Signed and Sealed this

Twentieth Day of October, 2009

David J. Kappos
*Director of the United States Patent and Trademark Office*